(12) United States Patent
Dhamrat et al.

(10) Patent No.: US 11,273,737 B1
(45) Date of Patent: Mar. 15, 2022

(54) VEHICLE SEAT CONVERTIBLE INTO UTILITY PLATFORM

(71) Applicant: Toyota Motor Engineering & Manufacturing North America, Inc., Plano, TX (US)

(72) Inventors: Hamshivraj Singh Dhamrat, Saline, MI (US); Lindsay A. Babian, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/062,390

(22) Filed: Oct. 2, 2020

(51) Int. Cl.
*B60N 2/36* (2006.01)
*B60N 2/882* (2018.01)
*B60R 16/03* (2006.01)

(52) U.S. Cl.
CPC .............. *B60N 2/36* (2013.01); *B60N 2/882* (2018.02); *B60R 16/03* (2013.01)

(58) Field of Classification Search
CPC ...... B60N 2/36; B60N 2/882; B60N 2/01508; B60N 3/001; B62D 33/023
See application file for complete search history.

(56) References Cited

U.S. PATENT DOCUMENTS

| | | | | |
|---|---|---|---|---|
| 2,612,207 A | * | 9/1952 | Branson | B60N 2/3011 |
| | | | | 297/331 |
| 5,462,334 A | * | 10/1995 | Sedorcek | A47C 9/06 |
| | | | | 297/252 |
| 5,551,750 A | * | 9/1996 | Yoshimura | B60N 2/882 |
| | | | | 297/250.1 |
| 6,095,059 A | * | 8/2000 | Riley | B60N 2/00 |
| | | | | 108/152 |
| 7,896,432 B2 | | 3/2011 | Dunkel | |
| 8,388,054 B2 | * | 3/2013 | Sayama | B60N 2/01583 |
| | | | | 297/15 |
| 8,757,719 B2 | * | 6/2014 | Hayakawa | B60N 2/3011 |
| | | | | 297/333 |
| 8,894,031 B2 | * | 11/2014 | Sailer | B60N 2/01 |
| | | | | 248/429 |

(Continued)

FOREIGN PATENT DOCUMENTS

| | | | | |
|---|---|---|---|---|
| CN | 106672122 A | | 5/2017 | |
| DE | 102012015518 A1 | * | 5/2014 | ............... B60N 2/01 |

(Continued)

*Primary Examiner* — Timothy J Brindley
(74) *Attorney, Agent, or Firm* — Snell & Wilmer LLP

(57) ABSTRACT

A removable vehicle seat convertible from a seat configuration into a platform configuration. In the seat configuration, the seat may include a cushion having a front end and a back end removably engaged with a floor of an interior of the vehicle. In the platform configuration, the front end may be positioned on the ground at a non-parallel direction to the ground. The seat may includer a back having a top end, a bottom end, and a rear surface pivotally attached to the cushion. The bottom end may be oriented towards the back end. The rear surface may be usable as a load-bearing utility surface. The cushion may support the back from the bottom end. The seat may include a headrest removably attached to the top end. The headrest may be engaged with a bumper or a tailgate of the vehicle and support the back from the top end.

19 Claims, 9 Drawing Sheets

(56) References Cited

U.S. PATENT DOCUMENTS

| | | | |
|---|---|---|---|
| 10,532,683 B1* | 1/2020 | Bowman | B60P 1/003 |
| 10,793,043 B2* | 10/2020 | Tovani | B60N 3/001 |
| 2002/0113480 A1 | 8/2002 | Senseby et al. | |
| 2007/0001474 A1 | 1/2007 | Aufrere et al. | |
| 2010/0117393 A1* | 5/2010 | Yamashita | B60N 2/01591 |
| | | | 296/37.8 |
| 2012/0313395 A1* | 12/2012 | Newberg | B60R 5/04 |
| | | | 296/65.03 |
| 2018/0072208 A1* | 3/2018 | Howe | A47B 5/04 |
| 2020/0156514 A1* | 5/2020 | Sweeney | A47C 4/028 |
| 2020/0164781 A1* | 5/2020 | Pascarella | B62D 33/0273 |
| 2020/0260167 A1* | 8/2020 | Gayon | H04R 1/08 |
| 2020/0324671 A1* | 10/2020 | Riad | B60N 2/3075 |

FOREIGN PATENT DOCUMENTS

| | | | | |
|---|---|---|---|---|
| EP | 2322377 A1 * | 5/2011 | | B60N 2/072 |
| GB | 2521438 A * | 6/2015 | | B60N 2/01508 |
| JP | H10338066 A | 12/1998 | | |
| JP | 2002282091 A | 10/2002 | | |
| KR | 19980029867 U | 8/1998 | | |
| WO | 2019110195 A1 | 6/2019 | | |

* cited by examiner

VEHICLE SEAT CONVERTIBLE INTO UTILITY PLATFORM

BACKGROUND

1. Field

The various aspects and embodiments described herein relate to apparatus for providing an automotive vehicle seat removable and convertible into a platform, such as a table, a desk, a workbench, and/or a sawhorse.

2. Description of the Related Art

Automotive vehicles may be driven to perform various activities, including camping, off-roading, tailgating, and exercising. Performing such activities may involve parking a vehicle and setting up an environment to prepare for those activities. For example, camping may warrant one to set up a cooking, eating, chopping, or placement surface. Off-roading or working on the vehicle may create a need to place tools on a flat surface in an organized fashion or perform work on small vehicle parts on the spot. Additionally, performing such activities may require a convenient power outlet to operate electrical tools. Using a surface either on the exterior or in the interior of the vehicle to perform such activities may damage the vehicle and provide to be inconvenient due to uneven and tight working spaces. Transporting a portable table or a workbench may take up unwanted cargo space and may cause unwanted movement inside the vehicle, contributing to buzz, squeak, and rattle ("BSR") as well as cosmetic damage to the vehicle. Further, such portable tables may not have a power source or a power outlet compatible to draw power from the vehicle. As such, there is a need for improved an improved utility platform.

SUMMARY

A removable vehicle seat convertible from a seat configuration into a utility or work platform configuration is disclosed herein. The seat in the utility platform configuration may be a table, desk, workbench, or sawhorse. In the platform configuration, the seat may be used as a platform to place, organize, and work on various items. The seat may have designated locations on it to place or hang certain items. The seat may have a power source and a power outlet to connect and operate electrical tools.

In accordance with an embodiment of the present disclosure, there may be a removable vehicle seat convertible from a seat configuration into a platform configuration. The seat may include a seat cushion. The seat cushion may have a front end and a back end. The seat may be removably engaged with a floor of an interior of the vehicle in the seat configuration. The front end may be positioned on a ground surface at a non-parallel direction to the ground surface in the platform configuration. The seat may have a seat back. The seat back may have a top end, a bottom end, and a rear surface. The seat back may be pivotally attached to the seat cushion. The bottom end may be oriented towards the back end. The rear surface may be usable as a load-bearing utility surface in the platform configuration. The seat cushion may support the seat back from the bottom end in the platform configuration. The seat may include a headrest removably attached to the top end. The headrest may be engaged with a bumper or tailgate of the vehicle. The bumper or the tailgate may support the seat back from the top end in the platform configuration.

The headrest may have a head resting portion and a mounting portion. The mounting portion may comprise at least one pin. The pin may have a first end and a second end. The first end may be removably inserted into at least one hole in the head resting portion in the seat configuration. The second end may be removably inserted into at least one hole in the top end in the seat configuration. The at least one pin may be detached from the head resting portion and attached to at least one receiving hole in the bumper or the tailgate of the vehicle in the platform configuration.

The seat may have a compartment located in the seat back or the seat cushion or a fastener on the seat back or the seat cushion to store the detached head resting portion of the headrest in the platform configuration. The seat may have at least one mounting fixture on the seat back to mount at least one item in the seat configuration or the platform configuration. The seat may have a power source and a power outlet in electrical communication with the power source for electronically connecting one or more electronic devices.

The seat may have at least one locking member. The locking member may have a first end and a second end. The locking member may be pivotally attached to the seat cushion or the seat back from one of the first and second ends. The at least one locking member may be lockingly engageable with the other of the seat cushion or the seat back from the other of the first and second ends to lock the seat cushion and the seat back in place relative to each other in the platform configuration. The at least one locking member may be an armrest.

The headrest may be engaged with a cavity shaped and sized to receive the headrest. The cavity may be located on the bumper or the tailgate in the platform configuration. The rear surface of the seat back may have a depression shaped and sized to receive a portable cooler, cooking equipment, or an electronic device.

In accordance with an embodiment of the present disclosure, there may be a removable vehicle seat convertible from a seat configuration into a platform configuration. The seat may have a seat cushion. The seat cushion may have a front end, a back end, and a bottom surface. The seat cushion may be removably engaged with a floor of an interior of the vehicle in the seat configuration. The bottom surface may be usable as a load-bearing utility surface in the platform configuration. The seat may have a seat back. The seat back may have a top end and a bottom end. The seat back may be pivotally attached to the seat cushion. The bottom end may be oriented towards the back end. The top end may be positioned on a ground surface at a non-parallel direction to the ground surface in the platform configuration to support the seat cushion from the back end. The seat may have a headrest removably attached to the top end with at least one pin. The at least one pin may have a first end and a second end. The first end may be removably inserted into at least one hole in the headrest in the seat configuration. The second end may be removably inserted into at least one hole in the top end in the seat configuration. One of the first and second ends may be removably inserted into at least one hole in a bumper or a tailgate of the vehicle in the platform configuration to support the seat cushion from the front end.

The seat may have a compartment located in the seat back or the seat cushion or a fastener on the seat back or the seat cushion to store the detached head resting portion of the headrest in the platform configuration. The seat may have at least one mounting fixture on the seat back to mount at least one item in the seat configuration or the platform configuration. The seat may have a power source and a power outlet in electrical communication with the power source for electronically connecting one or more electronic devices. The rear surface of the seat back may have a depression shaped and sized to receive a portable cooler, cooking equipment, or an electronic device.

The seat may have at least one locking member. The locking member may have a first end and a second end. The locking member may be pivotally attached to the seat cushion or the seat back from one of the first and second ends. The at least one locking member may be lockingly engageable with the other of the seat cushion or the seat back from the other of the first and second ends to lock the seat cushion and the seat back in place relative to each other in the platform configuration. The at least one locking member may be an armrest.

In accordance with an embodiment of the present disclosure, there may be a removable vehicle seat convertible from a seat configuration into a platform configuration. The seat may have a seat cushion. The seat cushion may have a back end. The seat cushion may be removably engage with a floor of an interior of the vehicle in the seat configuration. The seat may have a seat back. The seat back may have a top end and a bottom end. The seat back may be pivotally attached to the seat cushion. The bottom end may be oriented towards the back end. The seat back may form a V-shape with the seat cushion in the platform configuration. The V-shape may be upside down relative to a ground surface in the platform configuration. The seat back and the seat cushion may define a first leg of the platform in the platform configuration. The seat may have a board. The board may be supported by the first leg on one side and by a second leg on another side. The second leg may be defined by a bumper or a tailgate of the vehicle.

The seat may have at least one mounting fixture on the seat back or the seat cushion to mount at least one item in the seat configuration or the platform configuration. The seat may have a power source and a power outlet in electrical communication with the power source for electronically connecting one or more electronic devices.

The seat may have at least one locking member. The locking member may have a first end and a second end. The locking member may be pivotally attached to the seat cushion or the seat back from one of the first and second ends. The at least one locking member may be lockingly engageable with the other of the seat cushion or the seat back from the other of the first and second ends to lock the seat cushion and the seat back in place relative to each other in the platform configuration.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Figure 1:
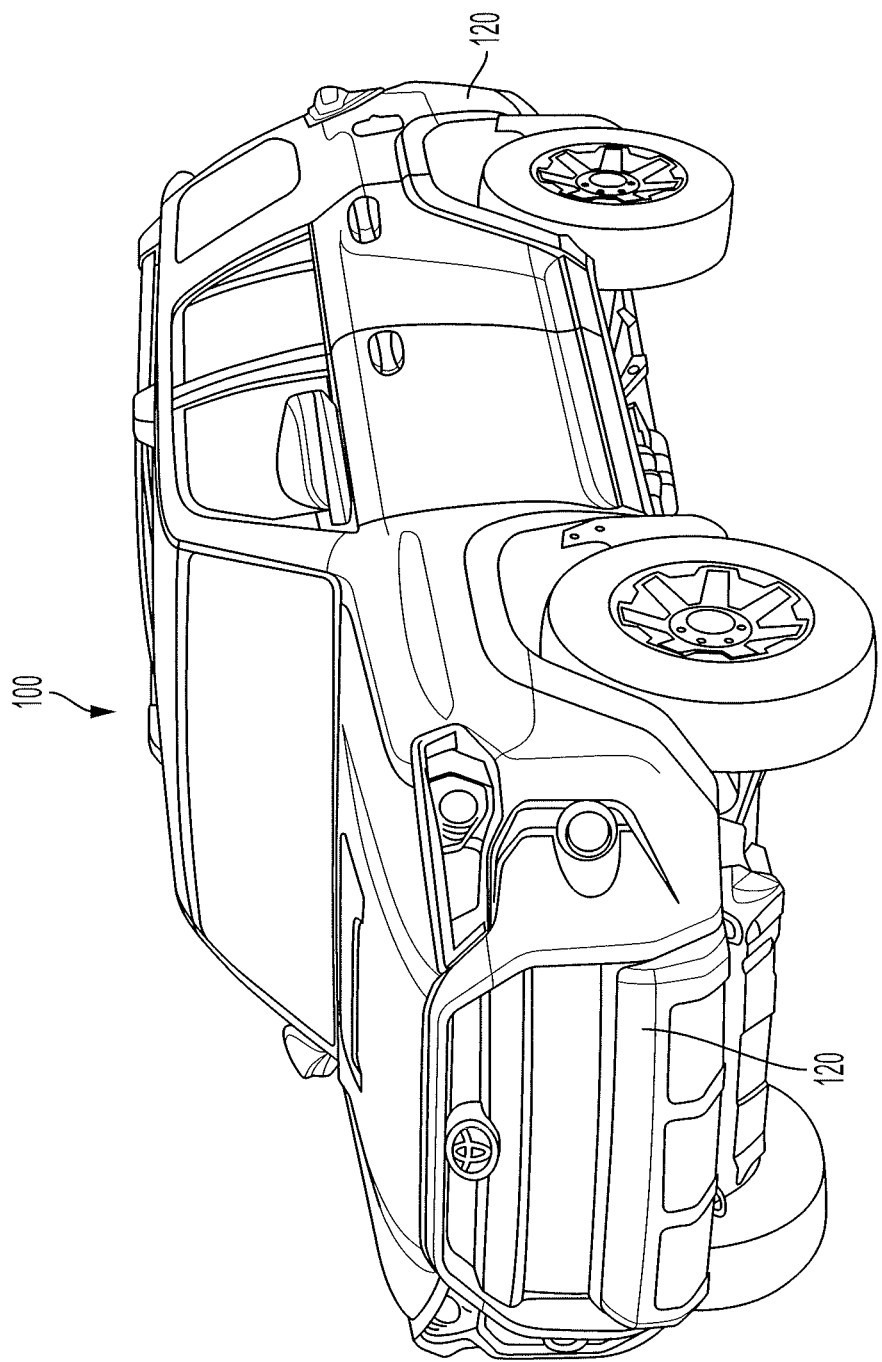
FIG. 1 illustrates a vehicle according to an aspect of the invention.

A vehicle 100 is shown in the FIGS. with a removable seat or removable seats 102 convertible from a seat configuration to a platform configuration. The seat 102 in platform configuration may be a table, a desk, a workbench and/or a sawhorse. The seat 102 may be removed from an interior 108 of the vehicle 100 and placed on the ground 110 next to the vehicle 100. A cushion 112 of the seat 102 may be positioned approximately perpendicular to the ground 110 and a back 114 of the seat 102 may be positioned approximately parallel to the ground 110. A rear surface 113 of the seat back 114 may advantageously define a working surface or a load-bearing utility surface. The seat cushion 112 may be a first support leg of the rear surface 113. A bumper 120 or a tailgate 122 of the vehicle 100 may be a second support leg of the rear surface 113. The seat 102 may include a power source and an outlet 104 to power or charge electrical and electronic devices. The seat 102 may include one or more mounting fixtures 132 to secure and organize various tools and items on the seat 102. The seat back 114 may advantageously have a depression 107 having the shape of a base of a cooler 105 or a cooking equipment (e.g., portable stove, grill, oven, etc.) to help place and secure them onto the rear surface 113.

In an embodiment, in initiating the conversion process, the seat 102 may be removed from the interior 108 of the vehicle 100 and set on the ground surface 110 in close proximity to the vehicle 100. In this position, a front end 123 of the seat cushion 112 may be positioned on the ground 110 at a non-parallel direction to the ground 110. Next, a headrest 116 removably attached to a top end 168 of the seat back 114 may be engaged with a bumper 120 or a tailgate 122 of the vehicle 100 to support the seat back 114 from the top end 168. The seat back 114 attached to and supported by the seat cushion 112 from a bottom end 128 of the seat back 114 may be used as a load-bearing utility surface.

In an embodiment, in initiating the conversion process, the seat 102 may be removed from the interior 108 of the vehicle 100 and set on the ground surface 110 in close proximity to the vehicle 100. In this position, the top end 168 of the seat back 114 may be positioned on the ground 110 at a non-parallel direction to the ground 110. Next, a headrest 116 removably attached to the top end 168 with at least one pin 117 may be removably inserted into at least one hole 119 in the bumper 120 or the tailgate 122 of the vehicle 100 once the headrest 116 is removed. The bumper 120 or the tailgate 122 may support the seat cushion 112 from the front end 123. The seat cushion 112 attached to and supported by the seat back 114 from a back end 124 of the seat cushion 112 may be used as a load-bearing utility surface.

In an embodiment, in initiating the conversion process, the seat 102 may be removed from the interior 108 of the vehicle 100 and set on the ground 110 in close proximity to the vehicle 100. In this position, the seat cushion 112 and the seat back 114 may form a V-shape with each other, the V-shape being upside down relative to the ground 110. The seat cushion 112 and the seat back 114 may collectively define a first support leg and the bumper 120 or the tailgate 122 may define a second support leg of a board 154. The board 154 may be used as a load-bearing utility surface.

FIG. 1 illustrates the vehicle 100 having the removable and convertible seat 102 (see FIGS. 2-6). The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator. The FIGS. depict an SUV by example. The vehicle 100 may have a bumper or bumpers 120 or a tailgate 122 that the seat 102 may be attached or positioned in relation to.

Figure 2:
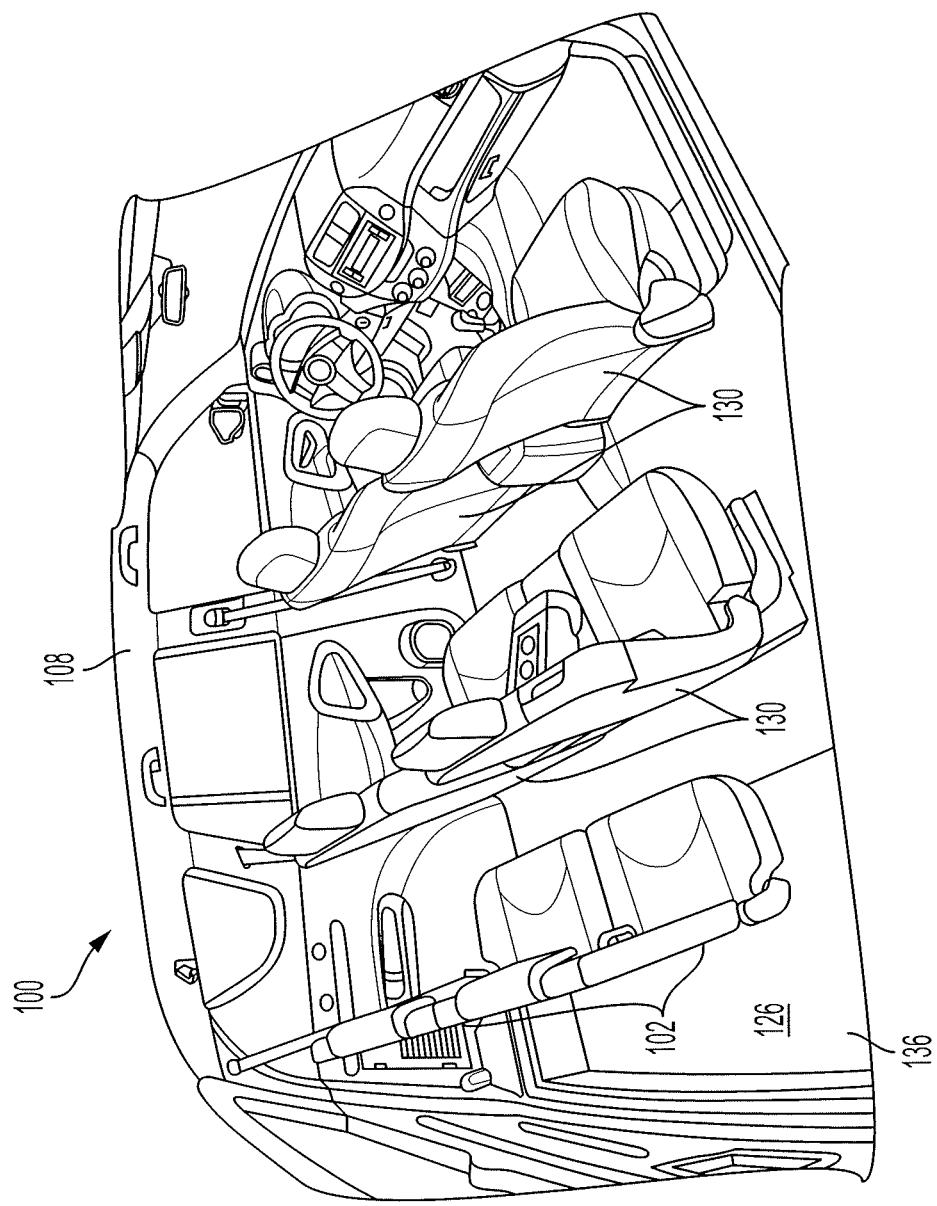
FIG. 2 illustrates an interior of the vehicle shown in FIG. 1 having a removable seat according to an aspect of the invention.

FIG. 2 illustrates the interior 108 of the vehicle 100 having the removable seats 102. In some embodiments, there may be a single seat 102. In some embodiment, there may be two or more seats 102. In some embodiments, the seats 102 may be a third row of seats, such as the seats 102 in FIG. 2. In some embodiments, the seats 102 may be in any other row of seats. The seats 102 may be next to seats 130. The removable seats 102 may be attached to the floor 126 of the interior 108 with a fastener. By example and not limitation, the fastener may be a latch. The latch or any other fastener used in attaching the seats 102 may be designed to engage and disengage quickly, frequently, and with relative ease compared to the seats 130, which may not be designed to be removed and reinstalled often (e.g., including many hard-to-reach screws). In some embodiments, the seats 102 may not be power seats that are electrically connected to a battery and seat adjustment system of the vehicle 100. This may reduce removal and reinstallation times as well as complexity of the removal and reinstallation processes of the seats 102. The seat 102 may have the external appearance of a conventional vehicle seat and function like one in the seat configuration. In some embodiments, the removable seats 102 and the seats 130 may have the same shape and size. In some embodiments, the removable seats 102 may be shaped or sized differently than the seats 130.

Figure 3A:
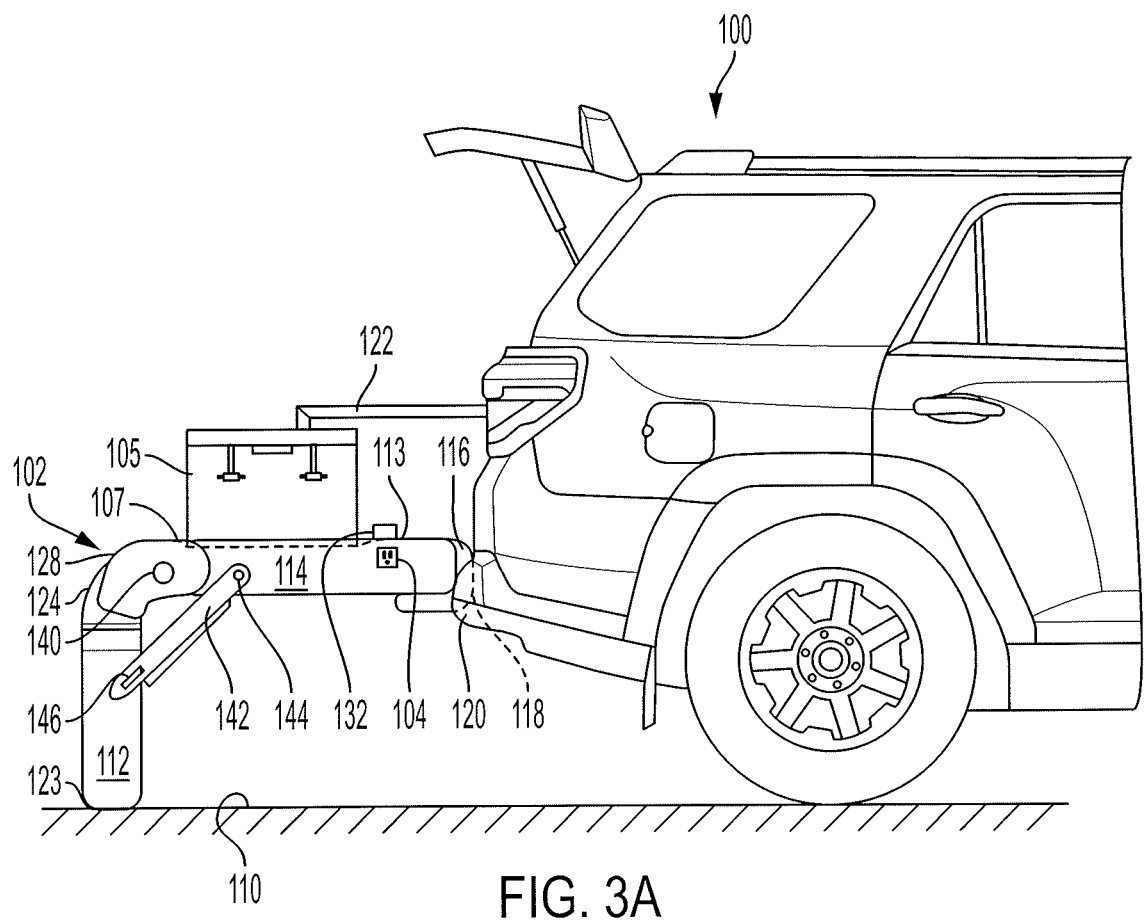
FIG. 3A illustrates the removable seat shown in FIG. 2 in a platform configuration according to an aspect of the invention.

FIG. 3A illustrates the removable seat 102 removed from the vehicle 100 and positioned on the ground 110 and the headrest 116 resting on the rear bumper 120 in a platform configuration. Alternatively, the headrest 116 may rest on the tailgate 122 or a trunk 136 (see FIG. 2) of the vehicle 100. There may be a resting surface 118 on the rear bumper 120. The resting surface 118 may be a cavity shaped and sized to receive the headrest 116. The seat cushion 112 may be positioned at a non-parallel direction the ground 110 such that its front end 123 is on the ground 110. For example, the seat cushion 112 may form a straight angle with the ground 110 as shown. The seat back 114 may be pivotally attached to the seat cushion 112. In some embodiments, the seat 102 may be anchored to the ground 110. For example, stakes may be used to anchor the seat 102 to the ground 110 from the seat cushion 112 or the seat back 114. A pivot joint 140 may go through the bottom end 128 of the seat back 114 and the back end 124 of the seat cushion 112. The seat back 114 may recline (i.e., pivot away from the seat cushion 112) or fold in (i.e., pivot towards the seat cushion 112).

Figure 3B:
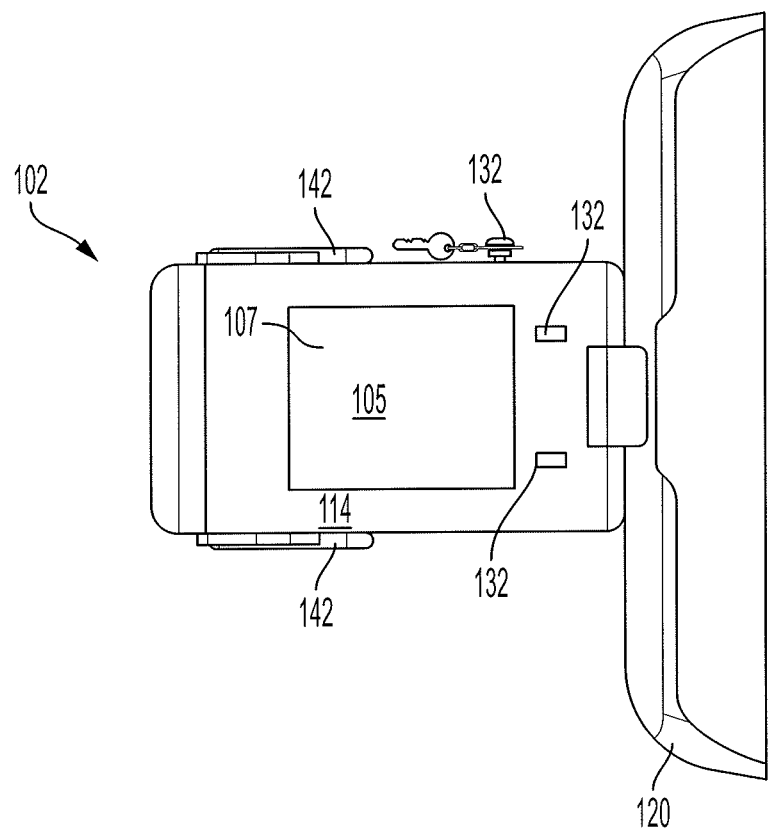
FIG. 3B illustrates a top view of the removable seat shown in FIG. 3A according to an aspect of the invention.

In some embodiments, the rear surface 113 of the seat back 114 may be parallel to the ground 110. In some embodiments, the rear surface 113 of the seat back 114 may be leveled with a horizontal plane. For example, a level may be built into or onto the seat back 114 to assist with leveling. The angle of the seat cushion 112 with respect to the ground 110 may be adjusted to level the rear surface 113. Once such an angle is formed, the seat back 114 may be locked into place relative to the seat cushion 112. The locking may be achieved via a locking member or members 142. In some embodiments, the locking members 142 may be arms. The arms 142 may stop movement of the seat back 114 relative to the seat cushion 112 or vice versa. In some embodiments, the arms 142 may be pivotally attached to the seat back 114 from a first end 144 and removably engaged with the seat cushion 112 from a second end 146 as shown in FIG. 3A. For example, the second end 146 may have a hole that can receive a pin attached to the seat cushion 112. In some embodiments, the arms 142 may be tucked back when not in use. In some embodiments, the arms 142 may be detached from the seat 102 and stored away. In some embodiments, the arms 142 may be armrests in the seat configuration. In some embodiments, the arms 142 may be pivotally attached to the seat cushion 112 from the first end 144 and removably engaged with the seat back 114 from the second end 146. The arms 142 may be on one side of the seat 102 or on both sides as shown in FIG. 3B.

In the platform configuration, the seat 102 may be used as a table by example. For instance, FIG. 3A shows the seat 102 as a table to set a cooler 105 down, which may be useful in outdoor activities, including camping and tailgating. In such embodiments, the rear surface 113 of the seat back 114 may advantageously have a depression 107 having the shape of a base of the cooler 105 to help place and secure the cooler 105 onto the rear surface 113 as shown. In an example, the depression 107 can function as a dock for cooking equipment (e.g., portable stove, grill, oven, etc.). The rear surface 113 of the seat back 114 may be made from a durable and abrasion resistant material (e.g., rubber, ballistic nylon, Rhino liner coating, etc.). The seat cushion 112 and the seat back 114 may be otherwise made from fabric or leather.

The seat 102 may have at least one mounting fixture 132 to mount and organize tools and items. The mounting fixture 132 may be on the rear surface 113 of the seat back 114 as shown in FIG. 3A. In some embodiments, the mounting fixture 132 may be on the headrest 116 or on the seat cushion 112. The mounting fixture 132 may be functional in both the platform and the seat configurations. The mounting fixture 132 may be a hook, ring, band, string, or another structure that can hold an object in place against gravity. The user may mount keys on the mounting fixture 132 as shown in FIG. 3B or a cellular phone, a speaker, a cable, a spatula, a utensils, or any other device, tool, or item that may be used in an outdoor activity or while working on the vehicle 100.

The seat 102 may include a power outlet 104 to plug in electronic or electrical devices. The power outlet 104 may be located on the seat back 114 as shown in FIG. 3A. In some embodiments, the power outlet 104 may be located on the seat cushion 112. The power outlet 104 may be in electrical communication with a power source. The power source may be inside or attached to the seat 102. The power outlet 104 may also draw power from a battery of the vehicle 100. By example and not limitation, the power source may be rechargeable and non-rechargeable batteries, a solar panel, or a power generator. In some embodiments, the power outlet 104 may be located on the headrest 116. The headrest 116 may have a power source, such as a battery, that can be recharged away from the seat 102 (e.g., inside the vehicle, at home, at garage, etc.) by detaching the headrest 116 from the seat 102. By example and not limitation, the power outlet 104 may be a conventional AC power outlet or a type of universal serial bus ("USB") connector.

Figure 4A:
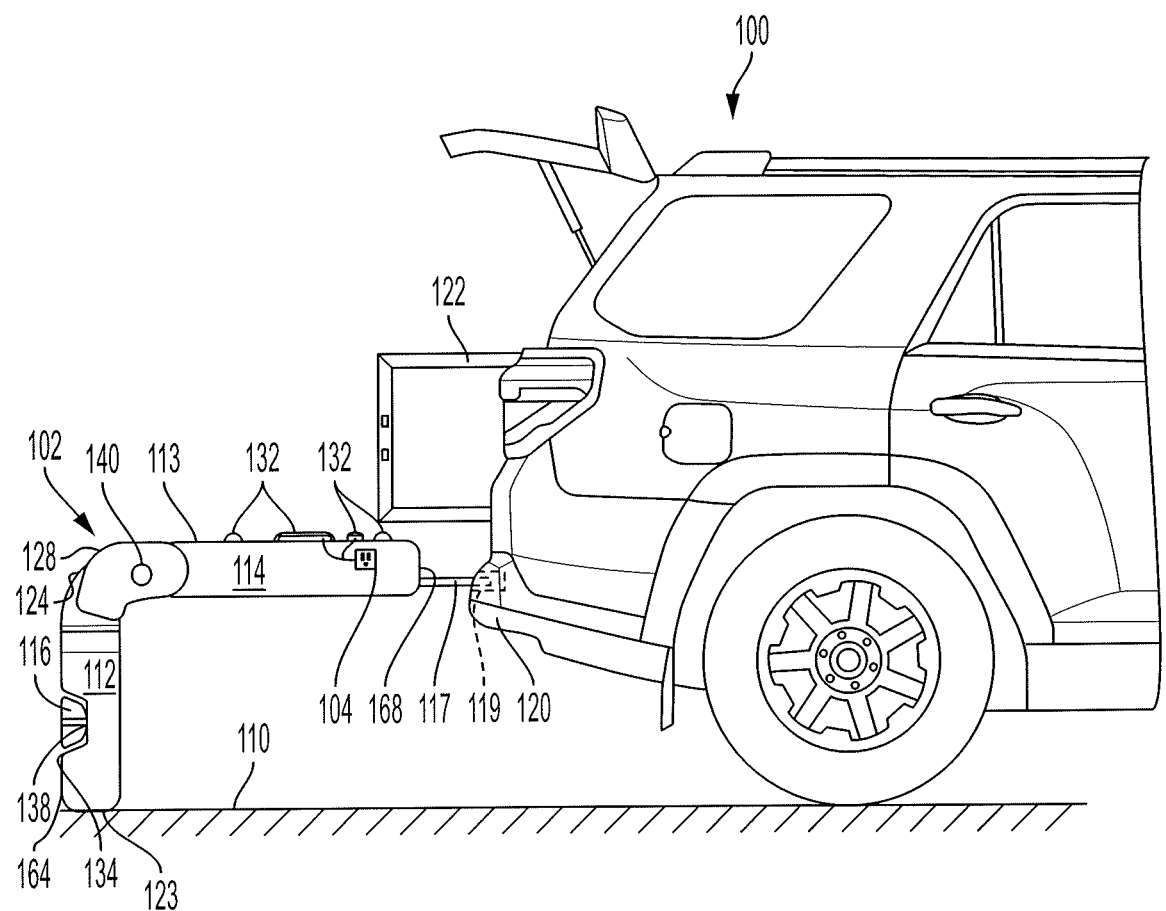
FIG. 4A illustrates the removable seat shown in FIG. 2 in a platform configuration according to an aspect of the invention.

FIG. 4A illustrates the removable seat 102 removed from the vehicle 100 and positioned on the ground 110 and one or more pins 117 of the headrest 116 being disconnected from the headrest 116 and connected to the rear bumper 120 in a platform configuration. Alternatively, the one or more pins 117 may be connected to the tailgate 122 or a trunk 136 (see FIG. 2) of the vehicle 100. Each of the pins 117 may be received by a hole 119. The pins 117 may be lockingly engageable with the holes 119. For example, each of the pins 117 may have a recess that engage with a tab that may be pushed up and down with a spring inside the hole 119. The pins 117 may retract inside the seat back 114 from the top end 168 when a headrest 116 is not desired in the seat configuration. The headrest 116 may be stored in a storage compartment 134 shaped and sized to receive the headrest 116. The storage compartment 134 may be located in the seat cushion 112 or the seat back 114. The storage compartment 134 may be accessible from the bottom surface 164 of the seat cushion 112 as shown. Alternatively, the storage compartment 134 may be accessible from the rear surface 113 of the seat back 114. The seat 102 may include a fastener 138, for example an elastic band, to secure the headrest 116 to the seat 102 when the headrest 116 is being stored. In some embodiments, the pins 117 may have an adjustable length. The user may change the proximity of the seat 102 to the vehicle 100 with the adjustable length of the pins 117. For example, the pins 117 may have attachable segments or telescoping bodies. In some embodiments, the pins 117 may be replaced with rods to increase the distance between the seat 102 and the vehicle 100 further.

The seat cushion 112 may be positioned at a non-parallel direction the ground 110 such that its front end 123 is on the ground 110. For example, the seat cushion 112 may form a straight angle with the ground 110 as shown. The seat back 114 may be pivotally attached to the seat cushion 112. A pivot joint 140 may go through the bottom end 128 of the seat back 114 and the back end 124 of the seat cushion 112. The seat back 114 may recline (i.e., pivot away from the seat cushion 112) or fold in (i.e., pivot towards the seat cushion 112).

In some embodiments, the rear surface 113 of the seat back 114 may be parallel to the ground 110. In some embodiments, the rear surface 113 of the seat back 114 may be leveled with a horizontal plane. For example, a level may be built into or onto the seat back 114 to assist with leveling. The angle of the seat cushion 112 with respect to the ground 110 may be adjusted to level the rear surface 113. Once such an angle is formed, the seat back 114 may be locked into place relative to the seat cushion 112.

Figure 4B:
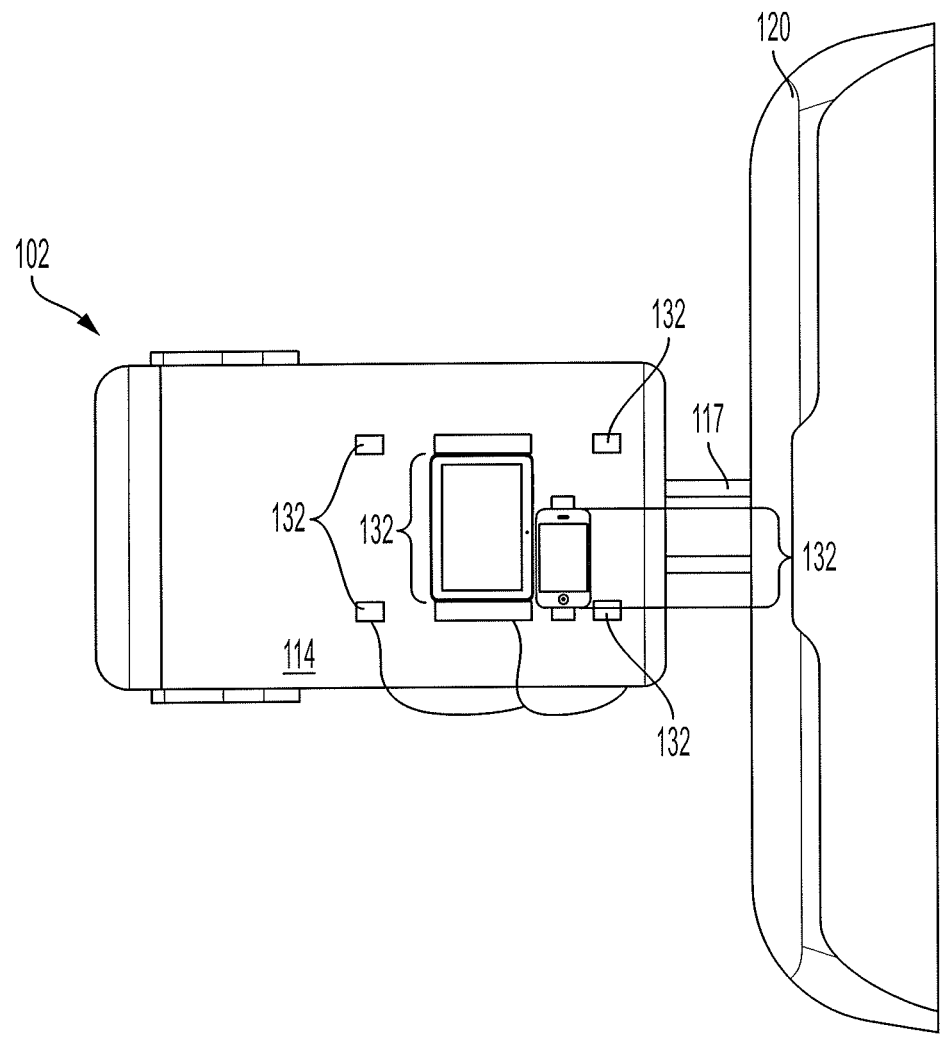
FIG. 4B illustrates a top view of the removable seat shown in FIG. 4A according to an aspect of the invention.

In the platform configuration, the seat 102 may be used as a table, a workbench, or a sawhorse by example. The rear surface 113 of the seat back 114 may be made from a durable and abrasion resistant material (e.g., rubber, ballistic nylon, Rhino liner coating, etc.). The seat cushion 112 and the seat back 114 may be otherwise made from fabric or leather. FIGS. 4A, 4B show a plurality of mounting fixtures 132 being used to mount and organize tools and items. The mounting fixtures 132 may be on the rear surface 113 of the seat back 114. By example and not limitation, FIG. 4B shows a tablet and a cellular phone both engaged with mounting fixtures 132 that serve as charging docks. The seat 102 may include a power outlet 104 to plug in electronic or electrical devices using a power cord. The devices may be held by the mounting fixtures 132 as shown in FIGS. 4A, 4B. The power outlet 104 may be located on the seat back 114.

Figure 5A:
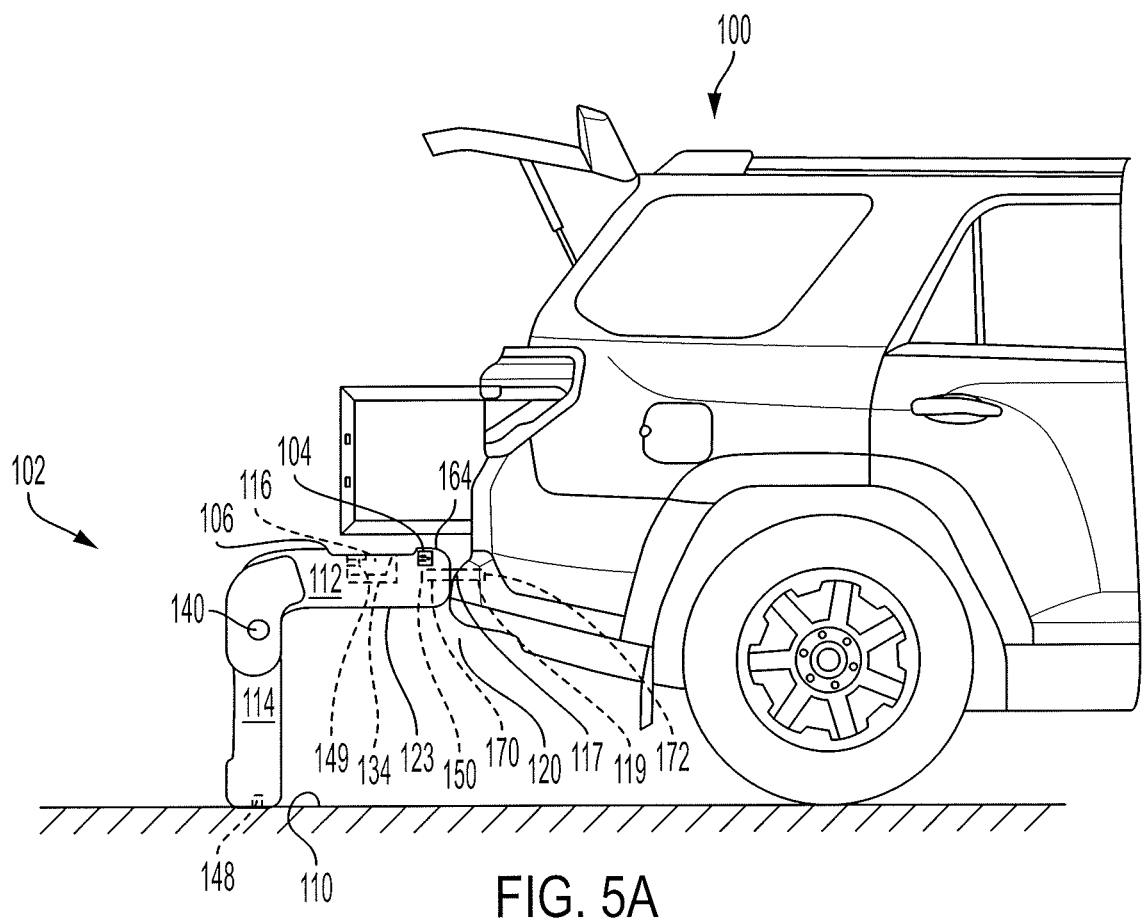
FIG. 5A illustrates the removable seat shown in FIG. 2 in a platform configuration according to an aspect of the invention.
Figure 5B:
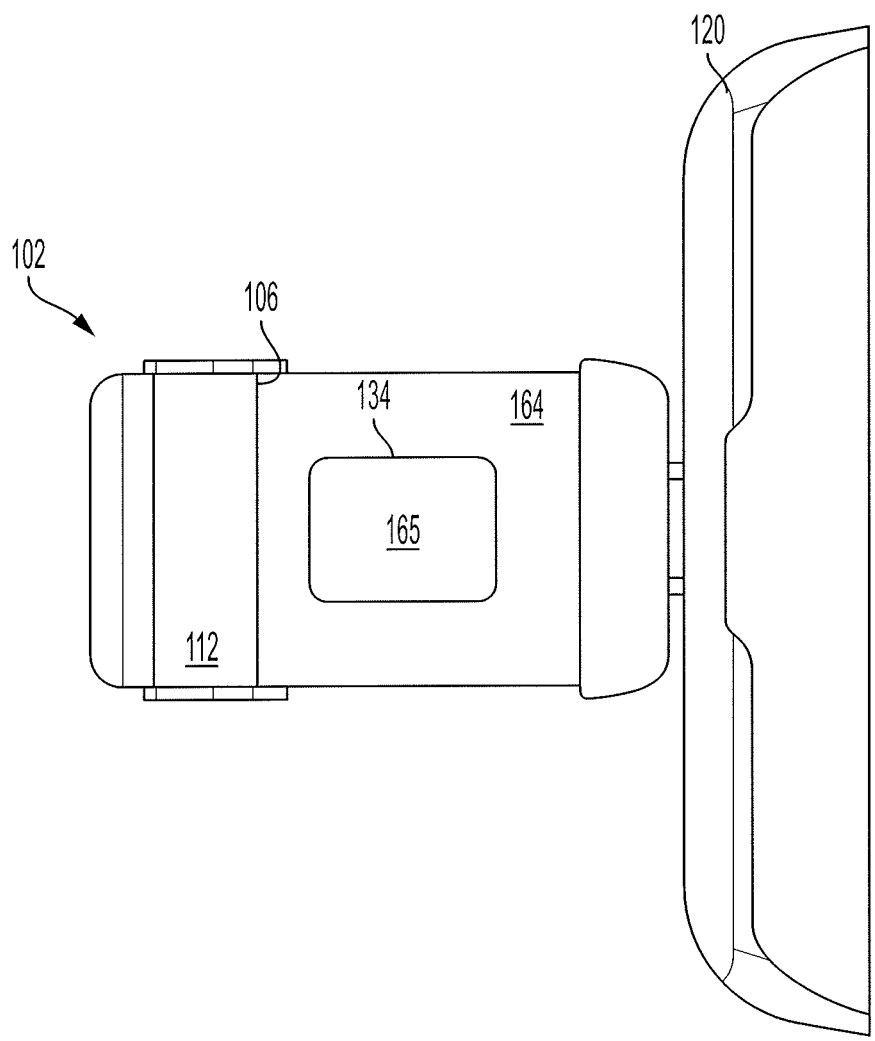
FIG. 5B illustrates a top view of the removable seat shown in FIG. 5A according to an aspect of the invention.

FIG. 5A illustrates the removable seat 102 removed from the vehicle 100 and positioned on the ground 110 and one or more pins 117 connecting the seat back 114 to the headrest 116 in the seat configuration instead connecting the seat cushion 112 to the rear bumper 120 in a platform configuration. A first end 170 of each of the pins 117 may be disconnected from holes 148 in the top end 168 of the seat back 114 and a second end 172 of each of the pins 117 may be disconnected from the headrest 116 from holes 149 in the headrest 116. The first end 170 of the pins 117 may each be inserted into holes 150 in the front end 123 of the seat cushion 112. The second end 172 of the pins 117 may each be inserted into holes 119 in the rear bumper 120. Alternatively, the second end 172 of the pins 117 may be connected to the tailgate 122 or a trunk 136 (see FIG. 2) of the vehicle 100. In some embodiments, the first end 170 and the second end 172 of the pins 117 may be interchangeable. The pins 117 may be lockingly engageable with the holes 119,148, 149,150. For example, each of the pins 117 may have a recess that engage with a tab that may be pushed up and down with a spring inside the holes 119,148,149,150. The holes 119,148,149,150 may be covered with plugs when not being used. The pins 117 may retract inside the seat back 114 from the top end 168 into the holes 148 when a headrest 116 is not desired in the seat configuration. The headrest 116 may be stored in a storage compartment 134 shaped and sized to receive the headrest 116. The storage compartment 134 may be located in the seat cushion 112 or the seat back 114. The storage compartment 134 may be accessible from the bottom surface 164 of the seat cushion 112 as shown. The storage compartment 134 may have a cover 165 that sits flush with the bottom surface 164 as shown in FIG. 5B. Alternatively, the storage compartment 134 may be accessible from the rear surface 113 of the seat back 114. In some embodiments, the pins 117 may have an adjustable length. The user may change the proximity of the seat 102 to the vehicle 100 with the adjustable length of the pins 117. For example, the pins 117 may have attachable segments or telescoping bodies. In some embodiments, the pins 117 may be replaced with rods to increase the distance between the seat 102 and the vehicle 100 further.

The seat back 114 may be positioned at a non-parallel direction the ground 110 such that its top end 168 is on the ground 110. For example, the seat back 114 may form a straight angle with the ground 110 as shown. The seat cushion 112 may be pivotally attached to the seat cushion 112. A pivot joint 140 may go through the bottom end 128 of the seat back 114 and the back end 124 of the seat cushion 112. The seat back 114 may recline (i.e., pivot away from the seat cushion 112) or fold in (i.e., pivot towards the seat cushion 112).

In some embodiments, the bottom surface 164 of the seat cushion 112 may be parallel to the ground 110. In some embodiments, the bottom surface 164 of the seat cushion 112 may be leveled with a horizontal plane. For example, a level may be built into or onto the seat cushion 112 to assist with leveling. The angle of the seat back 114 with respect to the ground 110 may be adjusted to level the bottom surface 164. Once such an angle is formed, the seat cushion 112 may be locked into place relative to the seat back 114.

In the platform configuration, the seat 102 may be used as a table by example. The bottom surface 164 of the seat cushion 112 may have a groove 106 having the shape of a base of an item, which may include a laptop and cooking equipment (e.g., portable stove, grill, oven, etc.). The groove 106 may help place and secure the item onto the bottom surface 164. The bottom surface 164 of the seat cushion 112 may be made from a durable and abrasion resistant material (e.g., rubber, ballistic nylon, Rhino liner coating, etc.). The seat cushion 112 and the seat back 114 may be otherwise made from fabric or leather. The seat 102 may include a power outlet 104 to plug in electronic or electrical devices. The power outlet 104 may be located on the seat cushion 112 as shown in FIG. 5A.

Figure 6:
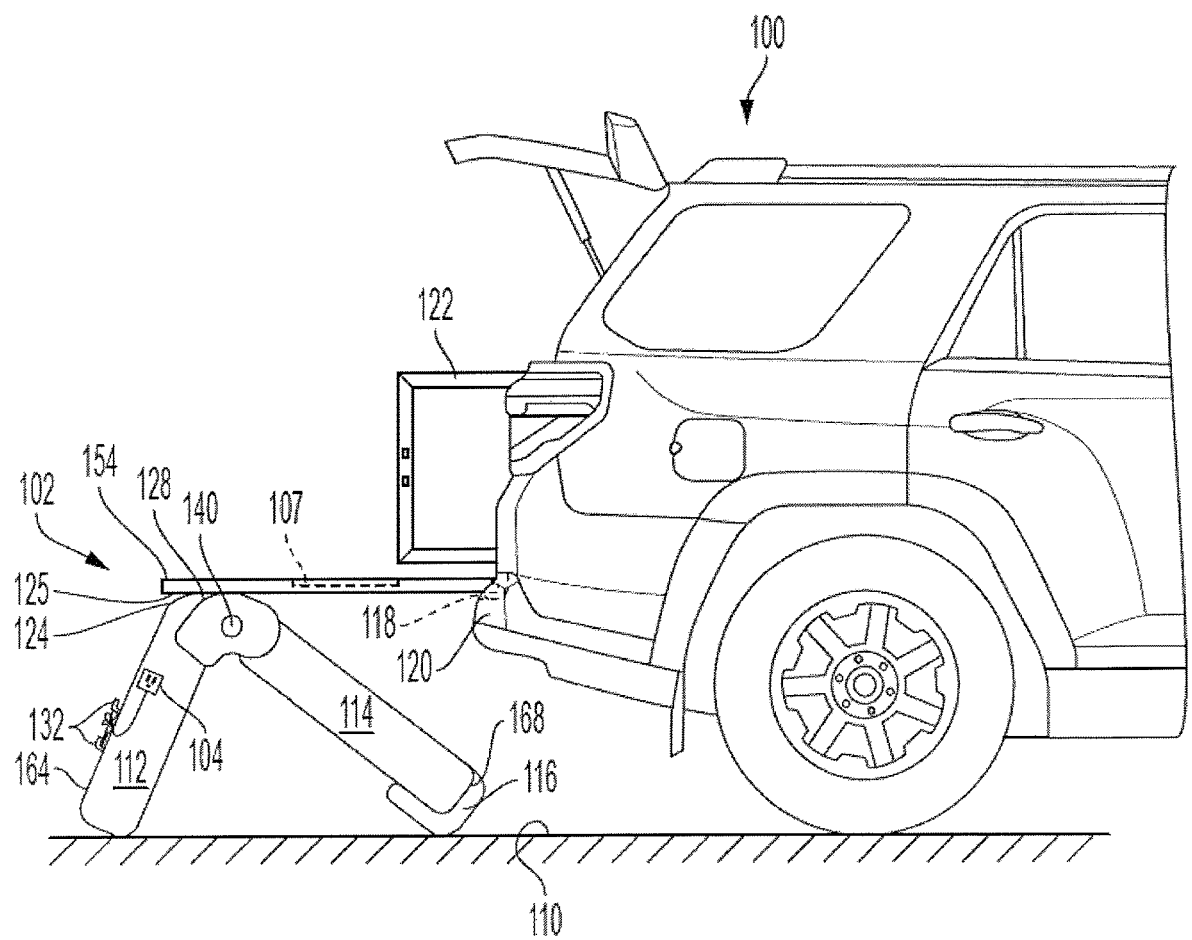
FIG. 6 illustrates the removable seat shown in FIG. 2 in a platform configuration according to an aspect of the invention.

FIG. 6 illustrates the seat 102 removed from the vehicle 100 and set on the ground 110 in front of the rear bumper 120 and the tailgate 122 where the seat cushion 112 and the seat back 114 may form a V-shape with each other. The V-shape may be upside down relative to the ground 110. The seat back 114 may be pivotally attached to the seat cushion 112. A pivot joint 140 may go through the bottom end 128 of the seat back 114 and the back end 124 of the seat cushion 112. The seat back 114 may recline (i.e., pivot away from the seat cushion 112) or fold in (i.e., pivot towards the seat cushion 112). The seat cushion 112 and the seat back 114 may collectively define a first support leg, and the bumper 120, tailgate 122, or the trunk 136 may define a second support leg for a board 154. The board 154 may be used as a working surface or a load-bearing utility surface.

In some embodiments, the board 154 may be parallel to the ground 110. In some embodiments, the board 154 may be leveled with a horizontal plane. For example, a level may be built into or onto the board 154 to assist with leveling. The angle between the seat cushion 112 and the seat back 114 may be adjusted to level the board 154. Once such an angle is formed, the seat back 114 may be locked into place relative to the seat cushion 112. In some embodiments, the headrest 116 may be removed such that the top end 168 of the seat back 114 is on the ground 110. In such embodiments, the pins 117 (see FIG. 4A) may be removed from the seat back 114 or retracted into the seat back 114. Holes 148 (see FIG. 5A) in the top end 168 of the seat back 114 may be covered with plugs. The board 154 may sit on a flat resting surface 125 on the seat 102. The resting surface 125 may be on the seat back 114. In some embodiments, the resting surface 125 may be on the seat cushion 112 or the intersection of the seat cushion 112 and the seat back 114. The board 154 may be fastened to the seat 102. By example and not limitation, clips, tiedown straps, and pins may be used to fasten the board 154 to the seat 102.

In the platform configuration, the seat 102 may be used as a table, a desk, a workbench and/or a sawhorse, for example. The board 154 may have a depression 107 having the shape of a base of an item, which may include a laptop and cooking equipment (e.g., portable stove, grill, oven, etc.). The depression 107 may help place and secure the item onto the board 154. In some embodiments, the board 154 may have a groove 106 (see FIGS. 5A, 5B). In some embodiments, the board 154 may be stored away in the vehicle 100, for instance under a compartment in the trunk 136 (see FIG. 2). In some embodiments, the board 154 may be reduced to a compact size and stored in or on the seat 102. For example, the board 154 may be attached to the bottom surface 164 of the seat cushion 112. In some embodiments, the board 154 may have detachable segments. In some embodiments, the board 154 may fold up. The board 154 may rest on a resting surface 118 on the rear bumper 120. The resting surface 118 may be a recess shaped and sized to receive the board 154. The board 154 may be fastened to the resting surface 118. By example and not limitation, clips, tiedown straps, and pins may be used to fasten the board 154 to the resting surface 118. The board 154 may be made from metal, plastic, wood, mineral, or glass. The board 154 may be abrasion resistant. The seat cushion 112 and the seat back 114 may be made from fabric or leather.

The seat may include one or more mounting fixtures 132. The mounting fixtures 132 may be on the bottom surface 164 of the seat cushion 112. The seat 102 may include a power outlet 104 to plug in electronic or electrical devices. The devices may be held by the mounting fixtures 132 as shown in FIG. 6. The power outlet 104 may be located on the seat cushion 112.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A removable vehicle seat convertible from a seat configuration into a platform configuration comprising:
   a seat cushion having a front end and a back end removably engaged with a floor of an interior of the vehicle in the seat configuration, the front end being positioned on a ground surface at a non-parallel direction to the ground surface in the platform configuration;
   a seat back having a top end, a bottom end, and a rear surface pivotally attached to the seat cushion, the bottom end being oriented towards the back end, the rear surface being usable as a load-bearing utility surface and the seat cushion supporting the seat back from the bottom end in the platform configuration;
   a headrest removably attached to the top end, the headrest being engaged with a bumper or tailgate of the vehicle, the bumper or the tailgate supporting the seat back from the top end in the platform configuration; and
   a locking member having a first end and a second end pivotally attached to the seat cushion or the seat back from one of the first end or the second end, the locking member being lockingly engageable with the other of the seat cushion or the seat back from the other of the first end or the second end to lock the seat cushion and the seat back in place relative to each other in the platform configuration.

2. The removable vehicle seat of claim 1, wherein the headrest has a head resting portion and a mounting portion, the mounting portion comprising at least one pin having a first end and a second end, the first end being removably inserted into at least one hole in the head resting portion and the second end being removably inserted into at least one hole in the top end in the seat configuration, the at least one pin being detached from the head resting portion and attached to at least one receiving hole in the bumper or the tailgate of the vehicle in the platform configuration.

3. The removable vehicle seat of claim 2, further comprising a compartment located in the seat back or the seat cushion or a fastener on the seat back or the seat cushion to store the detached head resting portion of the headrest in the platform configuration.

4. The removable vehicle seat of claim 1, further comprising at least one mounting fixture on the seat back to mount at least one item in the seat configuration or the platform configuration.

5. The removable vehicle seat of claim 1, further comprising a power source and a power outlet in electrical communication with the power source for electronically connecting one or more electronic devices.

6. The removable vehicle seat of claim 1, wherein the locking member is an armrest.

7. The removable vehicle seat of claim 1, wherein the headrest is engaged with a cavity shaped and sized to receive the headrest located on the bumper or the tailgate in the platform configuration.

8. The removable vehicle seat of claim 1, wherein the rear surface of the seat back has a depression shaped and sized to receive a portable cooler, cooking equipment, or an electronic device.

9. A removable vehicle seat convertible from a seat configuration into a platform configuration comprising:
- a seat cushion having a front end, a back end, and a bottom surface removably engaged with a floor of an interior of the vehicle in the seat configuration, the bottom surface being usable as a load-bearing utility surface in the platform configuration;
- a seat back having a top end and a bottom end pivotally attached to the seat cushion, the bottom end being oriented towards the back end, the top end being positioned on a ground surface at a non-parallel direction to the ground surface in the platform configuration to support the seat cushion from the back end; and
- a headrest removably attached to the top end with at least one pin having a first end and a second end, the first end being removably inserted into at least one hole in the headrest and the second end being removably inserted into at least one hole in the top end in the seat configuration, one of the first and second ends being removably inserted into at least one hole in the front end and another of the first and second ends being removably inserted into at least one hole in a bumper or a tailgate of the vehicle in the platform configuration to support the seat cushion from the front end.

10. The removable vehicle seat of claim 9, further comprising at least one mounting fixture on the seat cushion to mount at least one item in the seat configuration or the platform configuration.

11. The removable vehicle seat of claim 9, further comprising a power source and a power outlet in electrical communication with the power source for electronically connecting one or more electronic devices.

12. The removable vehicle seat of claim 9, further comprising at least one locking member having a first end and a second end pivotally attached to the seat cushion or the seat back from one of the first and second ends, the at least one locking member being lockingly engageable with the other of the seat cushion or the seat back from the other of the first and second ends to lock the seat cushion and the seat back in place relative to each other in the platform configuration.

13. The removable vehicle seat of claim 12, wherein the at least one locking member is an armrest.

14. The removable vehicle seat of claim 9, further comprising a compartment located in the seat back or the seat cushion or a fastener on the seat back or the seat cushion to store the detached headrest in the platform configuration.

15. The removable vehicle seat of claim 9, wherein the bottom surface of the seat cushion has a depression shaped and sized to receive a portable cooler, cooking equipment, or an electronic device.

16. A removable vehicle seat convertible from a seat configuration into a platform configuration comprising:
- a seat cushion having a back end removably engaged with a floor of an interior of the vehicle in the seat configuration;
- a seat back having a top end and a bottom end pivotally attached to the seat cushion, the bottom end being oriented towards the back end, the seat back forming a V-shape with the seat cushion in the platform configuration, the V-shape being upside down relative to a ground surface in the platform configuration, the seat back and the seat cushion defining a first leg of the platform in the platform configuration; and
- a board supported by the first leg on one side and supported by a second leg on another side, the second leg being defined by a bumper or a tailgate of the vehicle.

17. The removable vehicle seat of claim 16, further comprising a power source and a power outlet in electrical communication with the power source for electronically connecting one or more electronic devices.

18. The removable vehicle seat of claim 16, further comprising at least one locking member having a first end and a second end pivotally attached to the seat cushion or the seat back from one of the first and second ends, the at least one locking member being lockingly engageable with the other of the seat cushion or the seat back from the other of the first and second ends to lock the seat cushion and the seat back in place relative to each other in the platform configuration.

19. The removable vehicle seat of claim 16, further comprising at least one mounting fixture on the seat cushion or the seat back to mount at least one item in the seat configuration or the platform configuration.

* * * * *